United States Patent [19]

de Fay

[11] Patent Number: 5,012,349

[45] Date of Patent: Apr. 30, 1991

[54] METHOD AND PORTABLE DEVICE FOR DETECTION, STORAGE AND FOR EVENTUAL PROCESSING AND REPRODUCTION OF GRAPHIC SYMBOLS APPEARING ON ANY TYPE OF CARRIER

[76] Inventor: Stefan G. de Fay, 60 Rue Fondary, Paris 15 eme, France

[21] Appl. No.: 210,494

[22] PCT Filed: Jun. 26, 1987

[86] PCT No.: PCT/FR87/00251
§ 371 Date: Aug. 8, 1988
§ 102(e) Date: Aug. 8, 1988

[87] PCT Pub. No.: WO88/02586
PCT Pub. Date: Apr. 7, 1988

[30] Foreign Application Priority Data

Oct. 6, 1986 [FR] France .................. 86 13896

[51] Int. Cl.⁵ ............... H04N 1/04; H04N 1/23; G06K 9/22
[52] U.S. Cl. .................. 358/296; 358/473; 382/59; 346/143
[58] Field of Search .......... 358/296, 473; 382/59; 346/143

[56] References Cited

U.S. PATENT DOCUMENTS

| 4,523,235 | 6/1985 | Rajchman | 358/473 |
| 4,750,049 | 6/1988 | Murakami | 358/296 |
| 4,785,357 | 11/1988 | Dreyfus | 358/473 |
| 4,819,083 | 4/1989 | Kawai | 358/296 |
| 4,894,730 | 1/1990 | Yanagawa | 358/473 |
| 4,899,228 | 2/1990 | Sano | 358/473 |

Primary Examiner—Bruce A. Reynolds
Assistant Examiner—Scott A. Rogers
Attorney, Agent, or Firm—Lane, Aitken & McCann

[57] ABSTRACT

A method and device for recording, storing and reproducing graphic symbols such as text, indeograms and the like on a carrier comprises an independent portable assembly with an optical pick up, a memory for the storage of data and a printer. Graphic symbols can be picked up by placing the optical pick up in contact with, or in close proximity to, the carrier and drawing it along the line of text or symbols to be copied. These symbols are recorded in the memory and can be reproduced by placing the printer against another carrier and drawing the device across it. The quality of recording and reproduction is independent of the speed at which the device is drawn along the line of text, since the optical pick up is arranged to scan the symbols each time the device is advanced a predetermined distance.

29 Claims, 4 Drawing Sheets

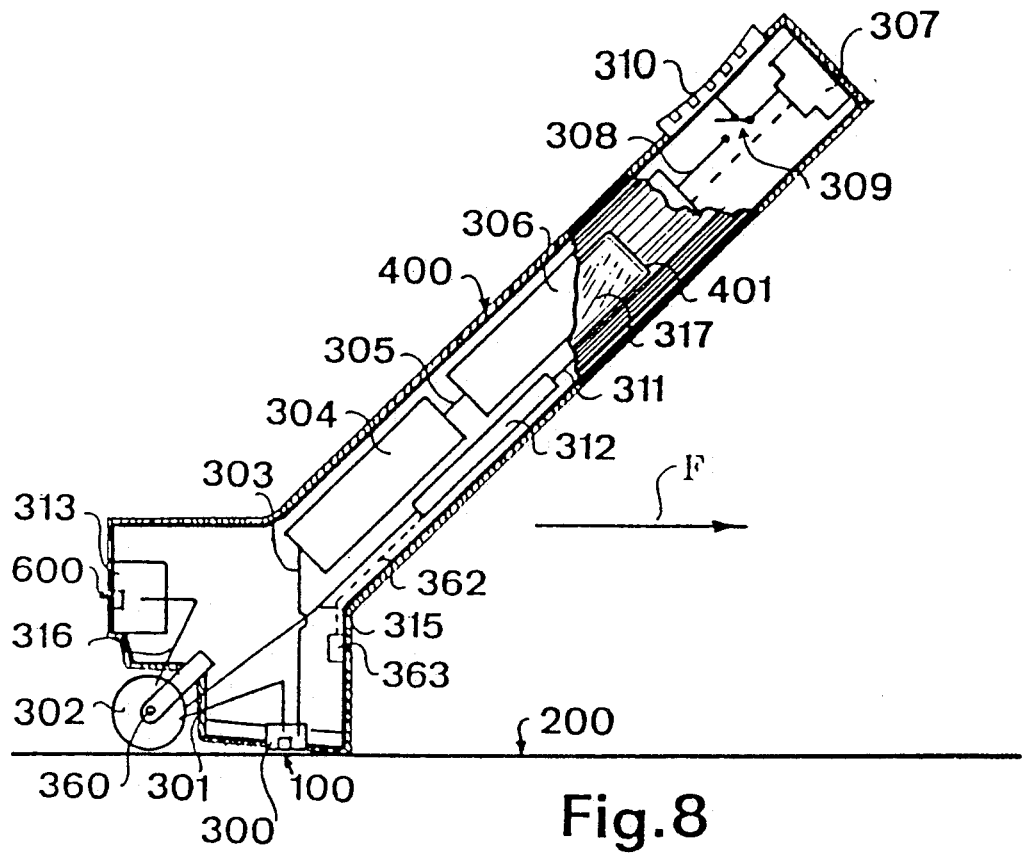

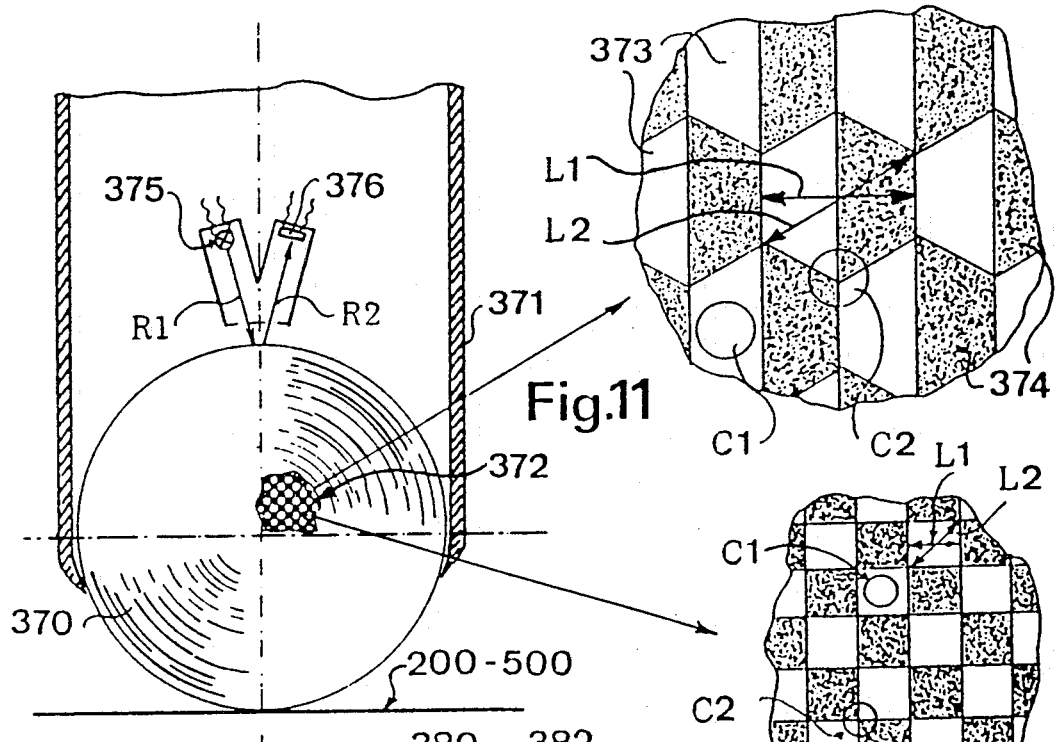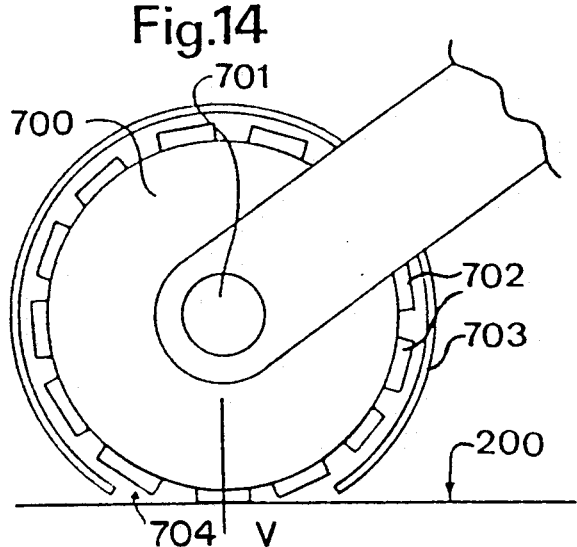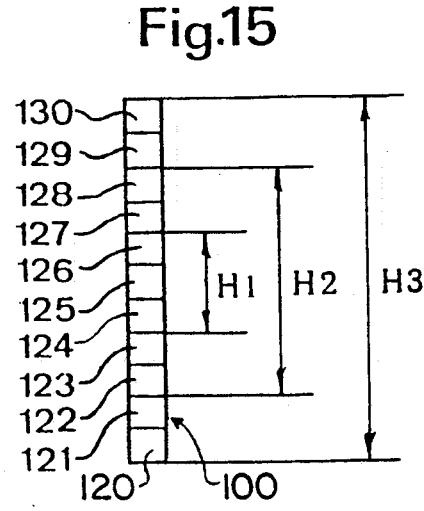

METHOD AND PORTABLE DEVICE FOR DETECTION, STORAGE AND FOR EVENTUAL PROCESSING AND REPRODUCTION OF GRAPHIC SYMBOLS APPEARING ON ANY TYPE OF CARRIER

It is known that the reproduction of graphic symbols, ideogram texts or drawings is growing in importance in step with the development of the information field since it is becoming ever more necessary to secure selective retention of the data required, in the absence of the faculty of total recall or of the means of storing great quantities of works, trade periodicals and documentation, whose volume actually renders access to these impracticable.

Apart from photography, which is mentioned at this point only as a reminder of its applications in respect of microfilms, several satisfactory photocopying and telecopying processes are now available. These processes, of whatever type, are embodied in heavy and bulky apparatus which preclude any possibility of using them as portable devices. As a matter of fact, these devices always operate with paper of a given and commonly standardised format. It is certainly possible to reproduce a page bearing no more than one line, but this would appear on its own on a whole page as placed in the feed magazine of the machine. Some devices utilise paper which is trimmed or cut commensurately with the graphics reproduced for each photocopy, but it is difficult to envisage being able to cut the paper on the scale of a single text line in a book, magazine or periodical.

Even assuming that this would be possible and desirable, it would not be possible to accumulate and collate several lines selected at different times and originating from a variety of sources on one and the same page. It is impossible moreover for lines or parts of lines selected amongst others, for example abstracted from a paragraph, to be reproduced individually.

It has already been contemplated to miniaturise a photocopier which is in the form of a battery operated portable device, the volume of which is about that of a hair dryer and which contains a roll of 'thermal' paper projecting outwards. The width of the paper is fixed and of approximately 4 cm. Its length is of course finite. To reproduce graphic matter, a small length of paper is pulled out, this is placed on the graphic matter, and held thereon firmly, after which the device is moved over the whole length of the design, which necessitates unrolling the paper which remains tensioned and held in application on the original, whilst taking care to maintain a strictly unchanged directional setting of the device with respect to the surface of the graphic matter. The latter is thus positioned under the paper but is reproduced on the paper, on the spot. The paper is severed transversely once the total length of the graphic matter has been covered in this manner.

This device also has serious shortcomings: first the reproduction quality depends on the speed at which the device is moved. The contrast is satisfactory when one acts slowly, but fades increasingly as the speed is increased, up to the point of disappearing completely. The quality varies commensurately if the speed is varied. The paper width is furthermore such that several text lines are necessarily reproduced at the same time, thereby preventing a fine selection as is always desirable upon selecting quotations or important words or passages of a text. The reproduction capacity depends on the length of the paper, and once this is used up, the device is unusable. This length being of the order of ten metres however, its reproduction capacity is of the order of fifty widths of standard A4 sheets, which is quite inadequate for professional applications. Making use of the device requires the availability of a stable, rigid and flat support, that is to say of a table or at least a small tray such as those in trains or aircraft. The device cannot be utilised in a waiting room or whilst bracing oneself against a wall or working on one's knees, since both hands are needed.

The copied graphics are present on paper strips of four centimetres width, which cannot be used for serious purposes unless they are glued on sheets or files. The reproduction principle is such that the data cannot be fed into a data bank. Finally, it should be stated that the cost of the device is high and that although it may be described as "portable", this is because it may be placed in a briefcase or small suitcase and because it operates on an independent power supply: batteries or an accumulator. It cannot however be carried on a person in the manner of a fountain-pen, and constitutes a heavy and unwieldy device.

Telefax devices are also known which comprise optical pickups combined with transcoders intended for conversion of the graphic symbols carried on a sheet in motion into usable electrical signals. As soon as the signals are generated, they are sent to a distance transmitter, commonly a telephone system.

These devices do not allow any selection of designs from all those appearing on a given page, since the page in motion is scanned systematically throughout its surface. They consequently operate like a photocopier combined with a transcoder and a transmitter. Furthermore, these devices are not portable and cannot be used manually.

It has already been contemplated to combine these existing devices to obtain reproducers or copiers which are displaceable with respect to the graphics which are to be copied. The purpose of these devices is to allow the copying of documents which are difficult or impossible to place on a photocopier: precious books or reference documents.

The following documents are thus known:

JP-A-55 115 773 appertaining to a prior description 1979, describes a scanning type photocopier, which may be carried by hand and comprises three distinct devices: a fixed control station (C), a movable "reader" (S) and a similarly movable reproducer (P), the two movable devices (S and P) being connected to the fixed station (C) by flexible electrical leads (8 and 9). Observing that it is unwieldy to handle both movable devices at the same time, this document teaches that the photocopier should be constructed as two devices only: a fixed control station (C) and a movable device (K) interconnected by a single flexible electrical lead (FIG. 8). The control station (C) comprises all the elements required for data transfer, as well as a cable connector for an external electrical power source, the movable device (K) containing no more than the components appertaining to the reading dunction on the one hand, and the components appertaining to the copying function on the other hand.

The document does not disclose a portable and independent device, capable of collecting—at different times—graphic data appearing on any kind of carrier, which are not necessarily placed on a plane support, and to store these for possible subsequent processing and equally possible reproduction: everything which has been recorded must be reproduced, since the apparatus is a photocopier. The actual apparatus always remains stationary but is connected via flexible electrical leads to the read and record heads which have been arranged to be movable with respect to the paper whereas the conventional photocopiers and telecopier machines comprise stationary heads and provide for displacement of the paper. Furthermore, no provision has been made for the protection of the data stored between their detection and reproduction, so that the apparatus is in no case portable and independent.

XEROX DISCLOSURE JOURNAL: Vol. 9, No. 2, March-April 1984, pages 163-164, which describes a document scanning head using a fixed guide rail, which presupposes that the document is placed on a flat support. Furthermore, the head is usable only in cooperation with a scale forming part of the guide rail. This document does not teach either the data storage method or any means of reproducing these. As a matter of fact, this is a head forming part of an assembly comprising a computer.

ELECTRONICS, Vol. 46, No. 3, 1/2/1973, pages 91-96, which relates to a detector for magnetic data to be supplied to a computer. No arrangements are provided for co-ordination of the matter recorded or for possible reproduction after eventual storage and processing.

U.S. Pat. No. 3,541,248 which describes a system comprising three separate devices: a reader head, a reproducer head and an intermediate control station. This system does not form an independent and portable device. Furthermore, it does not include a memory or means for gaining access to this memory. What is more, nothing is provided for ensuring the retention of stored data during the indefinite period elapsing between the recording of data and their eventual reproduction.

EP-A-0 146 472 which relates to improvements in the invention described in the preceding document and which proposes a device guided by means of rolling elements, the presence of a plane support for the document to be scanned thereby being rendered essential, this apparatus being connected via a flexible electrical lead (FIG. 2) to a separate external device, in particular a memory 53 such as a disc or magnetic tape (page 11, lines 1 to 6). This separate external device is also required for displaying the data picked up and there is no teaching of close co-ordination between recording and reproduction. On the contrary, it is stated that a separate printer should be provided (page 17, lines 4 to 8).

The present invention differs completely from the inventions described in these documents, since it relates to an actually portable independent assembly which may be placed in a garment pocket, and may be handled like a fountain-pen, that is to say "freehand" without a flat guide or support. An assembly constructed according to the invention is able to store graphic matter of very small height of the order of one standard line of text, or even a single term or group of words or a single ideogram, for the purpose of reproducing the matter stored in its original state or after processing, by graphic reproduction.

To this end, the invention has as its object a process for recording graphic symbols, words, ideograms or drawings appearing on a first unspecified carrier by displacing a movable assembly manually and without material guide, for the purpose of the reproduction on another unspecified carrier of graphic symbols previously recorded, being a process of the type in which use is made of a movable assembly comprising a pickup and a printer head and according to which, furthermore:

the movable assembly is positioned to face the first carrier, the movable assembly is set in translatory motion, graphic symbols are detected by means of the pickup, these symbols are transcoded into electrical signals forming data, these data are fed into a memory, characterised in that the movable assembly is portable and independent, and contains a memory and its own power source, and:

the independent portable assembly is moved along in one direction only, that is to say in a direction referred to as "forward run" or in the opposite direction referred to as "reverse run", at an unspecified speed;

graphic symbols freely selected by the user are recorded by means of the pickup, along a width the minimum value of which is of the order of the smallest size of a standard line of words or ideograms, and along any length.

the transcoded data are fed from the pickup into the memory as a function of the extent of displacement of the independent portable assembly.

these data are retained in the memory for an unspecified period, these data may possibly be modified subsequently whilst keeping the independent portable assembly idle, the independent portable assembly may as desired be subsequently positioned to face the said other carrier, the independent portable assembly is then moved across the other carrier either in forward run only, or in reverse run only, at an unspecified speed, the data stored are then extracted at a speed correlated with the extent of displacement of the independent portable assembly, these data are transcoded into electrical signals and fed to the printer head which translates them into corresponding symbols which it reproduces on the said other carrier at a speed correlated to the extent of the displacement of the independent portable assembly, the operation in progress, recording or reproduction, is interrupted as soon as the independent portable assembly is stopped, the operation in progress, recording or reproduction, is interrupted as soon as the independent portable assembly is displaced in the direction opposite to that originally selected.

According to other characteristics of this process:

if the independent portable assembly has to be placed on a carrier, the operation in progress—recording or reproduction—is interrupted as soon as the independent portable assembly is no longer in contact with the said carrier, if the independent portable assembly can remain spaced at a distance from a carrier, the operation in progress, recording or reproduction, is interrupted as soon as the independent portable assembly spaced apart from the said carrier by a distance exceeds a predetermined maximum;

to correlate the recording and reproduction speeds on the one hand and the speeds of displacement of the independent portable assembly on the other hand, the items of data are either stored in the memory or extracted from the memory at the rate of a particular maximum number of the said items of data per unit of distance actually traversed by the independent portable assembly:

the signals picked up are displayed in uncoded form at the rate at which the corresponding data are either fed into the memory or extracted from the memory;

the data previously stored are processed: modification, shifting, erasure, prior to reproduction on a carrier, the reproduced symbols then including differences from the symbols recorded;

the data are processed by insertion of data, either established by the user of the independent portable assembly, or supplied automatically by a device integrated in the independent portable assembly: calculater, clock and others;

stored data are erased either by action in response to an order, or automatically after one or more reproducing operations.

The invention also has as its object a movable assembly for the application of the above process, characterised in that it comprises an elongate separate and portable casing of the tracing instrument type, which has an optical pickup and at least one printer head which are functionally independent of each other, and which contains at least one memory, an independent power source, being a battery or the like, and possibly also other functional components such as a calculator, clock, control keys and the like, a first circuit incorporating the pickup, a transcoder and the memory, a second circuit incorporating the memory, a transcoder and the printer head, as well as at least one contactor intended for selectively activating either the first circuit for the purpose of detection of symbols and storage of the corresponding date, or of the second circuit for the purpose of extraction of the data stored and of reproduction of the corresponding symbols, the portable independent assembly furthermore comprising at least one element sensing the relative displacement of the independent portable assembly and of a carrier in confrontation with which should be positioned the said independent portable assembly and which is intended on the one hand to generate enabling signals for activation of the first circuit or second circuit as a function of the number of distance units travelled by the portable assembly and not as a function of the speed at which the same is displaced, and on the other hand for blocking access to the memory, whether on the input or the output side, as soon as the independent portable assembly is either stopped or displaced in the direction opposite to that originally selected.

According to other features of this assembly:

the element which senses the relative displacement between the independent portable assembly and a carrier is circular, such as a roller or sphere, is rotatably mounted and must be kept in contact with the said carrier so that it may be entrained in rotation during the said displacement so that it may then generate enabling signals at a repetition frequency which is directly proportional to the number of units of distance travelled by the said rotary element during the displacement of the independent portable assembly;

the rotary circular element carries small bars, each formed by at least one sensor element and spaced apart one from another by the value of the distance unit, which value may be such that the small bars are positioned one against another;

the rotary circular element carries multiple sensor units distributed in a close network such as a screen;

the element sensing the relative displacement between the independent portable assembly and a carrier is a detector having no material contact with a carrier such as a Doppler effect probe, a laser beam unit, an accelerometer and the like;

the element sensing the relative displacement between the independent portable assembly and a carrier is constituted by the pickup itself which is associated with a circuit able to detect and store symbols reproduced by the printer head for the purpose of determining the unit of distance and consequently the reproduction frequency;

the independent portable assembly comprises a detector of its correct position with respect to a carrier, which detector forms part of a circuit upon which it is to act depending on whether the independent portable assembly is or is not in the correct position with respect to a carrier;

the position detector senses the actual contact between the independent portable assembly and a carrier;

the position detector is a proximity detector;

the position detector is formed by a contactor which is constantly biassed towards an inactive position, that is to say a position in which it opens the circuit, and which it to be placed in an active position, that is to say a position in which it closes a circuit, by means of a sensor external to the independent portable assembly and sensing the actual presence of a carrier with respect to the part of the said independent portable assembly which comprises the pickup and the printer head;

the circuit comprises at least one indicator element such as an indicator lamp;

The circuit incorporates an access to the memory on the input side for storage of the data coming from the pickup, as well as on the output side for extraction from the memory of data intended for the printer head, the said input and output access being set up automatically as soon as the position detector is in the state which corresponds to an actual correct position of the independent portable assembly with respect to a carrier and blocked automatically as soon as the detector is in the inverse state which corresponds to an incorrect position of the independent portable assembly with respect to a carrier;

the effective width of the pickup and the effective width of the printer head are adjustable in a co-ordinated manner as a function of at least two minimum (HI) and maximum (H3) values;

the pickup is associated with a radiation emitter to emphasize the contrast between the graphic symbol and the carrier;

the independent portable assembly comprises a display unit which has an effective display height at least equal to the effective width of the pickup and of the printer head, that is to say the minimum height of which is of the order of the smallest dimension of a standard line of words or ideograms and on which the symbols should appear in readable form;

the independent portable assembly comprises a circuit incorporating the display unit so that the symbols may appear in uncoded form on the display unit in chronological order, simultaneously with the displacement of the portable assembly, these symbols being either the signals picked up, immediately following their transcoding, or the transcoded symbols derived from the data extracted from the memory;

the independent portable assembly comprises a circuit controlled by means of at least one key accessible from the outside of the said portable assembly, which circuit incorporates the display unit and at least one other active component to allow an uncoded display when the portable assembly is stopped, of two classifications of symbols;

symbols originating from the memory and symbols introduced by the user by means of keys or originating from a device integrated in the portable assembly: calculator, clock and others, a key being provided to control the said circuit to set up input access to the memory so that these input symbols may be stored;

the independent portable assembly contains a circuit allowing reproduction of the symbols according to a morphology differing from that of the symbols picked up, for example modification of dimensions, spacing and/or form;

the said circuit incorporates the display unit, the memory, input and output and a transcoder, and excludes the transcoder of the printer head, to allow on the one hand a display in readable form of symbols corresponding to the data extracted from the memory deactivating the printer head, and on the other hand the storage of data fed in by the user by means of keys or originating from a device integrated in the portable assembly: a calculator, clock and other;

the independent portable assembly is provided with means for connection to a separate external mechanism such as a keyboard, a printer, a display screen, a computer, or others, these devices being such that as a connector for a cable, an interface circuit, a contactor, optical fibres, a radiation emitter-receiver, and others;

the said connecting means are coupled to the memory via a circuit which renders it possible to perform a transfer with or without deletions, of the data contained in this memory, to a memory of a separate outside apparatus.

The invention will be better understood from the detailed description given in the following with reference to the accompanying drawing. The description and drawing are of course given only by way of informative but not restrictive example.

FIG. 8 is a schematic view showing an independent portable assembly according to the invention in the operative position for the scanning of a carrier;

FIG. 9 is a schematic view showing the same independent portable assembly as that of FIG. 8, but in its operative position for reconstitution by a graphic reproduction method of previously stored symbols;

FIG. 10 is a schematic view of an embodiment according to which the element sensing the relative displacement between the independent portable assembly and a carrier is produced in the form of a sphere;

FIGS. 11 and 12 are partial schematic views of the surface of the sphere and showing two possible forms for the reflective facets.

FIG. 13 is a schematic view of an embodiment according to which the element sensing the relative displacement between the independent portable assembly and a carrier is produced in the form of a Doppler effect detector;

FIG. 14 is a schematic view in cross-section showing how a rotary element is produced by comoining small sensing element bars and a roller;

FIG. 15 is a diagrammatic view illustrating the possibility of adjusting the width of the effective range of the pickup or of the printer head.

Figure 1:
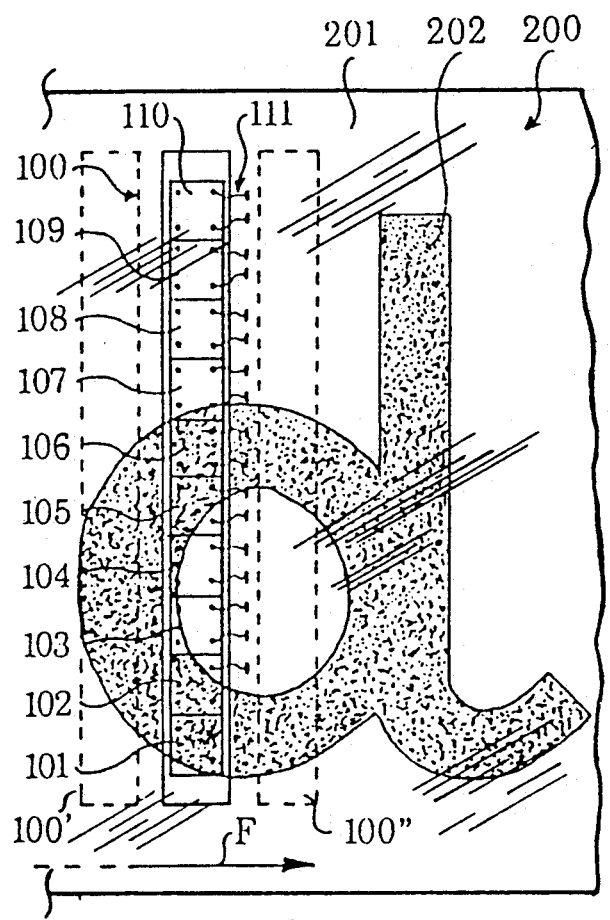
FIG. 1 is a schematic view illustrating the scanning of a carrier using a plurality of sensing elements in juxtaposition along a straight line and which are displaced together at right angles to the said straight line.

In the process corresponding to the invention, graphic symbols up which appear on an unspecified carrier: text, single terms, symbols, ideograms or patterns are picked up by displacing a pickup "freehand" fashion, that is to say without a guide of any kind.

The purpose of the operation is to extract data from a document, for the purpose of processing these by electronic means. According to the invention, graphic symbols are picked up optically, transcoded into electrical signals and the data corresponding to these signals are stored. Several possibilities are then available: these data may be erased wholly or partly by deleting them selectively; they may be amended by different processing operations: extraction from the memory, display, transfers, reinstatement in the memory, positional changes, modifications of all kinds; it is possible to introduce and store new data; finally, it is possible to reproduce symbols corresponding to these data in uncoded form on any kind of carrier.

It is apparent that the symbols thus reproduced may be wholly identical to those which has been scanned, or totally different symbols or else a combination of symbols originally picked up and of symbols resulting from the introduction of other data whilst applying access devices differing from those which had served the purpose of picking up the symbols appearing on a carrier.

The process according to the invention is intended to allow operations of this nature whilst ensuring the integrity of the symbols which are to be picked up, of the symbols stored and of the symbols to be reproduced. The invention consequently relates to a process which allows an independent portable device to be operated in the manner of a tracing instrument, and which should function under normal comfortable conditions for a user sat at a desk, as well as in more difficult conditions as in the case of a user working on his knees, in a car, in a waiting room, etc.

This process consequently differs completely from those involved in photocopying or telefax copying.

An example will now be described to illustrate the invention, and for this purpose there has been selected the particular embodiment according to which any type of carrier is scanned, which bears graphic symbols, whilst describing a double traversal: transverse and longitudinal with respect to the direction of the standard lines. In the western hemisphere, the lines are horizontal and comprise words written from left to right, but it is evidently also possible to have words written from right to left or else ideograms grouped along horizontal or vertical lines. This double scanning of the carrier is performed over a surface area which is small compared to that of the carrier and whilst displacing said area linearly, this area being divided moreover into elementary areas which may be very small, that is to say of the order of magnitude of the surface of a punctuation dot. The scanning of the area is performed transversely with respect to the direction in which it is displaced. Depending on whether the area displaced is situated above a written or unwritten section, signals are emitted accordingly and form data which are stored so that they may be recovered subsequently either to undergo processing operations or for reproduction of the graphic symbols previously picked up during the scanning operation.

The area scanned has a width substantially equal to the height of a standard line of western text and a width which is smaller the greater the accuracy of reproduction aimed at. A correlation with the visual display or reproduction devices is evidently required: printer head comprising ink-jet or daisy wheel printing means, definition of a display unit or monitor screen, etc.

For scanning, use is made of elements sensitive to the contrast between the symbols which are to be reproduced and the carrier on which they appear. These may be several elements which are aligned and all operative at the same time. Upon being displaced together, they scan the whole surface of the carrier having the length of their alignment as its width and the distance these elements are caused to travel as its length.

Each of these elements should then be differentiated to draw a distinction between the bright and dark dots across the width scanned at a particular point of the carrier scanned.

Considering the components actually available on the market, it may prove to be more sensible to perform a dynamic or static scanning operation, because the elements are then automatically differentiated because each emits a signal in its turn and in an unchangeable sequence.

The sensing element in question may be a single one, which is displaced from one extremity to the other of the sweep area, this sensing element being installed pivotally around a pin or slidably along rectilinear guides (dynamic scanning). Several juxtaposed sensing elements may also be applied (static scanning) and it is this solution which has been adopted here to illustrate the invention, since it is the most reliable.

In FIG. 1 is shown a sweep area 100 formed by the juxtaposition in a straight line of sensing elements 101 to 110 of any known type. Each is associated with electric means such as wires 111 supplying the power they require for operation and which transmit the signals emitted by the sensing elements according to whether these are placed in confrontation with a bright part of dark part of the carrier being scanned.

The area 100 should be displaced transversely to itself, that is to say longitudinally with respect to text lines of the western script type. The area 100 is aligned directionally in height transversely to the text line, and is displaced along the said line. This displacement is indicated in FIG. 1 by a pecked line which shows the position 100′ which had been occupied by the area 100 a little before its existing position which is depicted by solid lines, and by another pecked line which shows the position 100″ which will be occupied by the area 100 after its existing position.

The letter "d" assumed in this case to be the first letter of the term "data" is shown on a carrier 200. Before the position 100′, the sensing elements 101 to 110 were in front of a blank part of the carrier 200, for example a sheet of white paper. The operative elements have been activated successively, according to a process known per se, causing the activation of the element 101 by itself, then the activation of the element 102 and deactivation of the element 101, then the activation of the element 103 and deactivation of the element 102, and so on in accordance with a cycle having a particular frequency (static scanning). The sensing elements do not transmit any signal whilst facing a white sheet. Upon displacing the area 100, it reaches the position 100′ at which it confronts the left-hand side of the letter "d". The element 101 is then placed over a blank, that is to say light part, and does not transmit any signal upon being activated. The element 102 is placed over a written, that is to say dark, part and transmits a signal having a code indicating that—for the location in question—a contrasting (commonly black) point or dot should be stored which will have proportionately the same surface as that of the element 102. The elements 103, 104 and 105 will react like the element 102 since they are also positioned over a dark part. The elements 107, 108, 109 and 110 will react like the element 101 since they are placed above a light part.

Figures 2, 3:
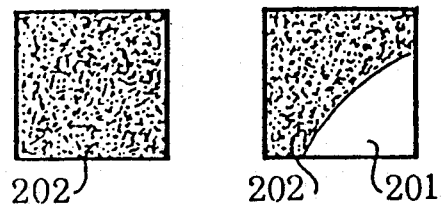
FIGS. 2 and 3 are schematic views illustrating the importance of the selection of a distance unit.

As for the element 105, it gives rise to the following comments, especially regarding FIGS. 2 and 3, since it partially lies above the blank carrier 200 and partially over the dark loop of the "d": each sensing element has a specific and irreducible surface reacting in 'all or nothing' fashion.

If it is wholly positioned above a homogenous part, either wholly blank 201 or wholly dark 202 as shown in FIG. 2, no problem is encountered since there is no ambiguity. If however it is faced at the same time with a light part 201 and a dark part 202 (FIG. 3), the element will react as a function of its sensitivity. If this is very high, it will react whilst making very close allowance for the preponderant part. In the case of FIG. 3, the element will react as in the case of FIG. 2, since the dark part 202 is more extensive than the blank part 201. Conversely, a low degree of sensitivity will lead to uncertainty, particularly if the light and dark parts are almost equal. The importance of scanning resolution (or "definition") will consequently be grasped, meaning that sensing elements should be adopted which have as small as possible a surface, especially in the direction parallel to the long axis of the area, if a high degree of definition is required and/or if it is desired to be able to pick up faint graphic symbols. The greater the surface of the elements, the worse will be the accuracy of reproduction. The more the surface is reduced, the more satisfactory will be the accuracy of reproduction.

To obtain very fine definition in the optical analysis of the graphic pattern, it is now possible to use not individual sensing elements which are grouped afterwards, but a screen the sensing elements of which are tiny, that is to say of the order of a few microns, yielding a frame comprising up to several hundred sensing elements per square milimetre. All, or only some of them, are electrically connected and in use as a result.

Figure 4:
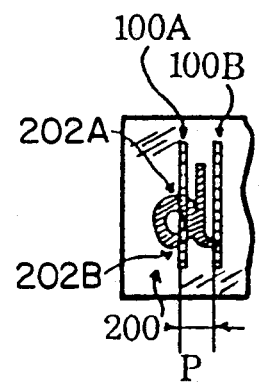
FIGS. 4, 5 and 6 are schematic views showing the importance of a close definition of a transverse scan.
Figure 5:
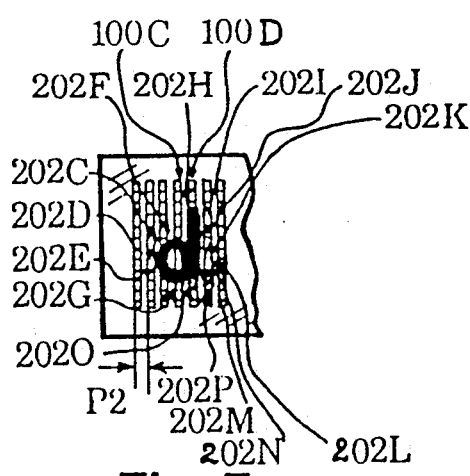
Figure 6:
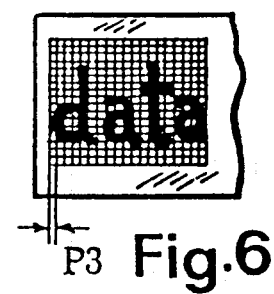

Referring to FIGS. 4 to 6, diagrams are shown demonstrating the importance of the selection of a distance unit for the displacement of the whole area 100, in order to eliminate discrepancies caused by the speed of displacement.

As stated above, the area 100 should be displaced at right angles to its long axis, along the text line containing the letter "d" in the present example, which is denoted by the arrow F in FIG. 1. This displacement is of a continuous nature, but since the scanning operation is of intermittent nature, the scanning function and the forward displacement function should be co-ordinated. Furthermore, if the scanning action is inherently regular, the forward displacement is irregular and random by nature, since it depends on the mode of operation of the person holding the instrument and who displaces the same in freehand manner and in random material conditions.

If the scanning action is slow compared to the forward displacement, a "gap" is formed between two scans as is apparent from FIG. 4, and it is sufficient to peruse this to grasp that in the case of a very large displacement unit P1, it is only the parts of the "d" situated before the area 200 in the position 100A and those situated before the area 100 in the position 100B which will be detected, stored and reproduced, because no scan between these two positions is theoretically taken into account. In a case of this kind, the start of the loop of the "d" would not have been detected, nor its end of the stem of the letter "d". In fact, only the two points 202A and 202B would be reproduced.

One can adopt a smaller distance unit P2, like that shown in FIG. 5. The vertical scan can be taken into account each time the zone 100 has travelled a distance corresponding to one third of a letter of the type "d". In the case illustrated, following detection and storage, the left-hand part of the loop of the "d" would be reproduced: points 202C, 202D and 202E, as well as a fraction of the central part of the loop: points 202F and 202G, then the stem as a whole over eight points 202H to 202 O (or the eight sensing elements 102 to 108), then a point 202P for the bottom dash of the stem.

A reproduction of this kind would be acceptable because the reader would easily recognize the letter "d". A tiny shift would have been sufficient at the onset of the displacement of the area 100 for the stem of the "d" to be positioned between the two positions 100C and 100D and thus wholly missing from the reproduction, making the displayed symbol illegible.

The best solution consequently consists in selecting a distance unit P3 equal to the width of the area 100 since the successive positions of the said area 100 are tangential with respect to one another and do not leave a gap between them which is liable to contain an appreciable dark portion.

FIG. 6 illustrates this solution with the term "data" shown complete, and it is possible to check that the dimensional ratio between the height of the sensing elements 101 to 110 and the distance unit P3, establishes a virtually continuous grid throughout the height of the script line (height at least equal to that which separates the tip of the stem and the tail of the foot of the letters bearing the same, plus a definite allowance) over an indefinite length.

The invention consequently specifies a co-ordination between the vertical scan and a linear distance unit which depends on the geometrical dimensions (distance travelled by the area 100) and not on the speed of displacement of the said area 100.

The distance unit may be determined in accordance with the invention by assuring a very rapid scanning action and making provision to allow for the signals (that is to say their detection) coming from the sensing elements, in a sequential manner and at a repetition rate which does not depend on the linear displacement speed, but on the distance unit: the scanning action begins at the onset of each displacement and is practically instantaneous. Consequently, notwithstanding the speed at which the independent portable assembly is displaced, the scanning operation covers the whole surface, having the scanning height as its width and the distance travelled as its length. The detection quality is thus unaffected by the speed, and above all by the continuity or irregularity of this speed.

This represents a first safety measure for the integrity of the symbols which are to be processed: the symbols which are to be detected.

The scanning action is also interrupted if the displacement is interrupted. As a consequence, detection is blocked as soon as the displacement is stopped. A stoppage of this kind may however occur at any time, because the invention is applicable in the case in which symbols are picked up selectively: a word, then a whole line, then two consecutive words etc., and all this on any occasion precisely as one would make use of a fountain-pen and not of a photocopier during office work.

This establishes a second safety measure for the integrity of the symbols which are to be processed: the symbols in the course of being detected, because no others than the scanned symbols are picked up, without any possible interference.

Figure 7:
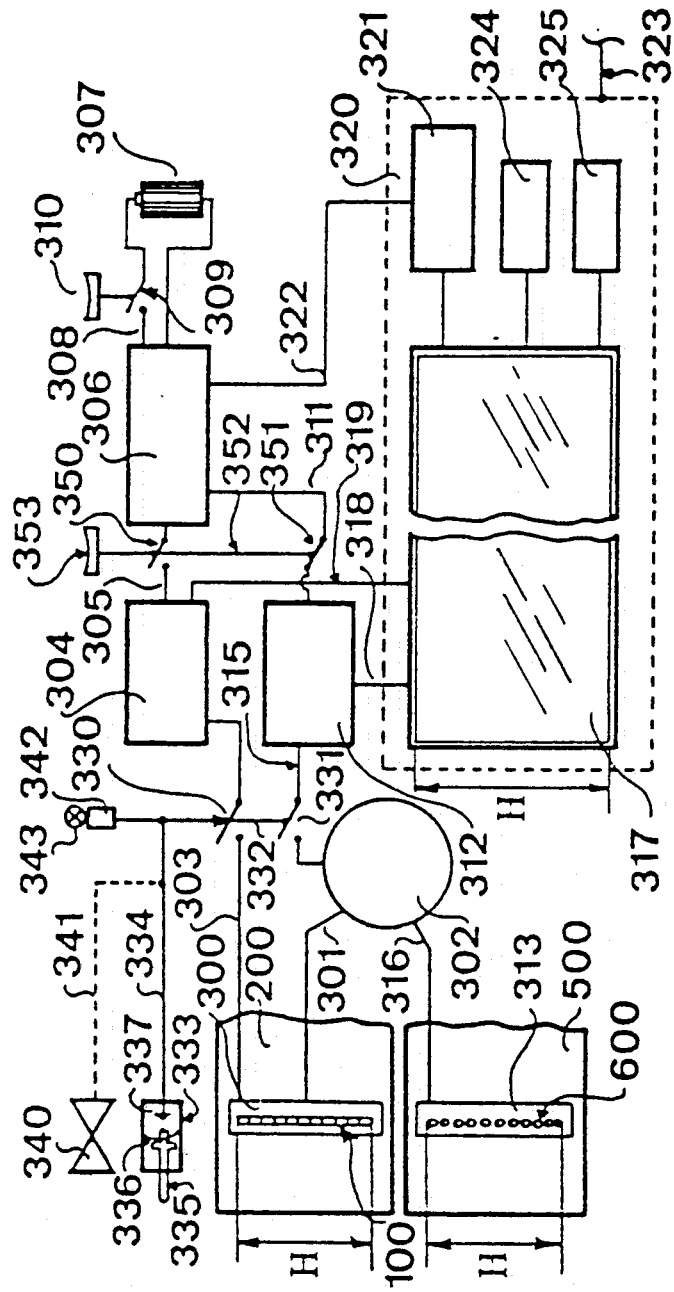
FIG. 7 is a schematic diagram of an independent portable assembly according to the invention.

An independent portable assembly utilising the process according to the invention has a general layout such as that of FIG. 7. It comprises a "reader head" or pickup 300 the area 100 and joined by a connection 301 to an element 302 sensing the relative displacement of the pickup 300 and of a carrier 200 which is to be scanned. This element 302 yields a repetition rate for detection of the signals emitted by the sensing elements as a function of the distance travelled by the independent portable assembly since it causes the onset of a scanning action for each distance unit travelled.

It would also be possible to provide a variable scanning speed but an equivalence would then have to be established between the speed of displacement and the scanning speed so that the latter is synchronised with the said displacement.

The scanning speed is then directly proportional to that of displacement: the faster the displacement, the faster the scanning action will be; the slower the displacement, the slower the scanning action will be.

Notwithstanding the solution adopted, the result consequently is that the operation of the independent portable assembly is made independent by the speed of displacement and that the quality obtained remains constant.

The pickup 300 supplies coherent elementary images corresponding to the co-ordinates of each sensing element and to the "dark" or "light" signal, which latter can be simply the absence of a signal to simplify the operation, as known per se.

These images are transmitted via a connection 303 to an input transcoder 304 of any known type which, via a connection 305, transmits electrical signals forming data to a memory 306 integrated in the independent portable assembly. The electrical energy required by the assembly is supplied to it by a battery 307 connected to a feed circuit 308 incorporating a switch 309 operated by a knob 310. Depending on the type of memory 306, the data is contains are retained or dumped upon opening the switch 309. The selection of this memory consequently depends on the uses envisaged, as is certainly known per se. It should be emphasised however that an independent portable assembly according to the invention acquires its whole interest if it is provided with a memory which keeps its data even in the absence of a power supply or if it comprises a permanent supply source, in particular thanks to a supplemental and so-called "emergency" battery vital to retention of the date stored (not shown).

This problem apart, the memory 306 is coupled via a connection 311 to an output transcoder 312 of any known kind which is intended to receive the data drawn from the memory 306 and to transmit corresponding electrical signals for the subsequent readable reproduction of graphic symbols originally detected by the pickup 300.

It has been stated that there are two different transcoders: 304 for detection and 312 for reproduction, but one versed in the art will know that it is possible in practice to provide a transcoding circuit common to both functions.

The signals coming from the output transcoder 312 are intended for a so-called "printer" head 313 which is situated close to the pickup 300, that is to say at the same extremity of the independent portable assembly in this case. This latter should be displaced linearly to cause reproduction of the symbols on the second carrier, in the same way it had to be displaced linearly to detect the symbols of the first carrier. In this case too, the quality of reproduction should be made independent of the speed of displacement of the independent portable assembly.

This is why the output transcoder 312 has a connection 315 to the element 302 and not a direct connection to the printer head 313 which has a connection to the element 302. With this system, the speed of extraction of data and their delivery to the printer head 313 are synchronized with the random displacement of the independent portable assembly, which displacement is sensed by the element 302.

If the displacement is interrupted the reproduction is also interrupted. Therefore, as soon as the displacement is stopped, the operation of the printer head 313 is blocked. A stoppage of this kind may however occur at any instant since the invention is applicable in the case in which symbols may be reproduced selectively instead of performing a systematic transfer of all the symbols detected, and all this on any occasion, precisely as one would make use of a fountain-pen.

This represents a third safety measure for the integrity of the symbols which are to be processed: the symbols stored, because all the symbols extracted are reproduced, the interruption of the displacement causing ipso facto the blocking of any data extraction from the memory.

With the example illustrated, the independent portable assembly comprises a display unit 317 the useful height H of which is equal to the heights H of detection for the pickup 300 and of reproduction for the printer head 313, respectively. The display unit 317 is of any known type, in particular a graphic LCD unit, and has a connection 318 to the decoder 312. The data extracted from the memory 306 and transcoded into uncoded symbols by the transcoder 312 pass in review on the display unit 317 at the instant of reproduction. A connection 319 to the input decoder 304 is also provided so that the symbols detected by the pickup 300 may equally pass in review on the display unit 317 during detection. This display operation allows visual checking of the operation in progress.

This represents a fourth safety measure for the integrity of the symbols which are to be processed: the symbols in transit, either being fed into the memory or emerging from the memory, because they are all displayed and the user may restart a defective operation such as for example, restarting a pickup operation which had been interrupted by an accidental interruption of the displacement.

According to a feature of the invention however, the display unit 317 forms part of a circuit 320 comprising a particular decoder 321 as well as the memory 306 by means of a connection 322. In this manner, by actuating keys (not shown but their connection 323 to the circuit 320 being depicted), the user is able to extract already stored data and to cause these to appear on the display unit 317 thanks to the transcoder 321, without however wishing to reproduce these. To this end, it is necessary that both the pickup 300 as well as the printer head 313 should be inoperative. It is necessary and is consequently sufficient that the portable assembly should be at rest.

In this situation, the independent portable assembly allows the user to introduce new data, to amend the data picked up, to store the modifications made and then, if appropriate, to reproduce the final result. The modifications made in this manner may be of any kind, depending on the complexity of the circuit 320 and of the control keys as well as of the logic system or systems inserted: complete or partial text processing, runpast of the data or stationary display, selection of the symbols to be reproduced, modification of the reproduction sequence, displacement, selective erasure, enlarging, reducing, underlining, variable and/or proportional spacing, colour change, etc. The visual check by means of the display unit enables the user to check the data in question and to correct errors if applicable.

This represents a fifth safety measure for the integrity of the symbols which are to be processed, namely the supplemental or modified symbols, since they are all displayed and available for possible correction.

Furthermore, the circuit 320 may incorporate a calculator 324 and a clock 325, which are constantly supplied with power thanks to a battery (not illustrated) which may be incorporated. These integrated devices generate electrical signals forming data which may be stored and which are transcoded into symbols appearing in uncoded form on the display unit 317. These data may be reproduced in combination with the data originating from an earlier scanning operation or from an inserting operation by means of the keys of the connection 323.

According to the applications which are envisaged, the independent portable assembly should be placed either in actual contact with the carrier or at a particular distance from it, to pick up symbols and reproduce them. In the one case as well as the other, it is advisable to assure that no item of data can be lost if the proximity condition is disturbed seriously by accident or misjudgement, for example contact interrupted or critical distance exceeded.

The manner in which a safety feature of this nature may be established is apparent from FIG. 7: switches 330 and 331 coupled via a connection 332 and operated by a correct position detector, are placed on the connections 303 and 315.

If the correct position of the independent portable assembly with respect to the carrier means that these should be in mutual contact, use may be made of an indicator 333 connected to the switches 330 and 331 by any known means, denoted by a connection 334. The indicator 333 may for example comprise a sensor 335 which is constantly biassed by a spring 336 towards a position of extraction with respect to a stationary part 337 integral with the independent portable assembly, in which position it is inactive, meaning that it leaves in an idle position a contactor which is not illustrated, which controls a circuit comprising the connection 334, so that the switches 330 and 331 remain open. When the independent portable assembly is applied correctly against a carrier, the sensor 335 is thrust back to the inside of the stationary part 337 against the action of the spring 336. The contactor is then in an active position, meaning that it causes the closing of the switches 330 and 331. The independent portable assembly may operate thereupon, the main switch 309 being assumed to be closed.

Once the assembly is no longer in contact with the carrier, the switches 330 and 331 are open and neither the scanning nor reproducing operations can occur. Therefore, if the relative position between the independent portable assembly and the carrier becomes incompatible with a reliable operation, the operation is interrupted to prevent a spurious storage or actual loss of data should the printer head be capable of operating 'in vacuo'.

This represents a sixth safety feature for the integrity of the symbols which are to be processed: the user cannot perform a low quality scanning operation and cannot lose any of the data drawn from the memory.

On the other hand, as soon as the contact is re-established, the operation in progress is resumed at precisely the same spot at which it had been interrupted.

The opposite of the need for an effective contact is a complete lack of contact so that detection of the correct or incorrect position is a problem resolved by the "all or nothing" method. The invention however has as its object to devise an independent portable assembly which operates with considerable reliability despite the absence of any material guide and under any conditions. A more flexible situation could consequently be preferred, which ensures a reliable operation whilst allowing particular irregularities.

Instead of a contact indicator 333, use is then made of a proximity detector 340 of any type known per se, associated with the switches 330 and 331 via a connection. An operation equivalent to that described above is obtained with this system, but the opening of the switches 330 and 331 occurs only when the distance between the independent portable assembly and the carrier exceeds a predetermined maximum value. When this distance is smaller than this maximum, inclusive of being equal to zero in case of contact, the switches 330 and 331 are closed and the independent portable assembly is in the operative condition. To this end, the pickup 300 may be complemented by an optical system of the kind known as "autofocus", which ensures an automatic setting notwithstanding the distance of the pickup below the maximum specified.

To complete this system, provision may be made for the circuit to comprise a warning element 342 which in this case consists of a luminous indicator denoted by a bulb 343. Not only do the switches 330 and 331 open immediately and automatically as soon as the position of the independent portable assembly with respect to the carrier is no longer correct, but the light bulb 343 lights up moreover to warn the user rightaway that an anomaly has occured.

This represents a seventh safety feature for the integrity of the symbols which are to be processed: the user is informed of a malfunction and is able to eliminate it.

The pickup 300 and the printer head 313 are close to each other but functionally separate from each other, since their operations should be automatic, but, since they are incompatible, their simultaneous energisation should be prevented.

A simple solution for this purpose consists in placing the pickup 300 and the printer head 313 in opposition, whilst being close to the same extremity. To perform a scan, the user holds the independent portable assembly so that the pickup is turned towards the carrier. To perform a reproducing operation, the user turns the independent portable assembly over so that the printer head 313 replaces the pickup, which is then turned in the opposite direction.

These arrangements may be completed by providing a connector separate from the main switch 309, which has been illustrated in FIG. 7 in the form of an array comprising a switch 350 on the connection 305 and a switch 351 on the connection 311, both being coupled via connection 352 associated with a two-position control knob 353. When the independent portable assembly is being used for pickup purposes, the user consequently actuates the knob 353 so that the switch 350 is closed and the switch 351 is open. When the independent portable assembly is being used for reproduction purposes, the user actuages the knob 353 so that the switch 350 is open and the switch 351 is closed (which is the situation illustrated in FIG. 7).

Referring to FIGS. 8 and 9, it is apparent how an independent portable assembly according to the invention may be constructed. Its general shape is that of a fountain-pen or other tracing instrument, having an oblong case 400 which contains the pickup 300, the printer head 313, the memory 306 and the battery 307 as well as the other elements and electronic components described above. It has a lateral opening 401 through which the display unit 317 is visible.

The element 302 sensing the relative displacement between the independent portable assembly and a carrier may either be of a kind requiring contact with the carrier, or operating with a particular spacing. If the "contact" solution is selected, the element may be rotary and in particular have the form of a roller or sphere. If the "contactless" solution is selected, the element may be an accelerometer, a radiation system (ultrasonics, infra-red, laser, etc.) or again a Doppler effect sensor.

According to anothe principle reference, marks are caused to be projected on to the carrier at spacings corresponding to a distance unit and these marks are detected as and when they are produced, the repetition rate deriving therefrom thus being a function of the spped of translation of the independent portable assembly, and ensuring synchronised scanning.

The example of a turning roller entrained by friction against the carrier relative to which the independent portable assembly is displaced, is that selected in FIGS. 8 and 9. The roller 302 is rotatably installed around a pin 360 whose axis is parallel to the plane of the carrier 200-500.

The roller 302 is so positioned that it is in constant contact with the carrier 200 which is to be scanned, whether the portable assembly is in the scanning position (FIG. 8) or reproduction position (FIG. 9). The roller 302 should be entrained by friction against the carrier 200 when the independent portable assembly is displaced in the direction of the arrow F. The rolling surface of the roller 302 should therefore be of the non-slip variety.

The roller 302 should generate enabling signals every time is travels a distance unit. To this end, it may be associated with a mechanism of any known type suitable for effecting a scanning cycle upon passing each distance unit.

The repetition rate of the scanning actions consequently depends directly on the speed of rotation of the roller 302, rendering it proportional to the speed of displacement of the independent portable assembly, making the scan quality independent of this speed.

The same applies to reproduction, since the printer head 313 receives the data from the transcoder 312 in accordance with the repetition rate set up by the roller 302. The reproduction quality consequently remains constant irrespective of the speed of displacement of the independent portable assembly. It will be observed furthermore that the reproduction quality and its speed are unaffected by the speed of the scanning operation. A graphic symbol may be scanned slowly and reproduced rapidly or vice versa, without the quality being affected. There is obviously an upper limit for the speed of displacement of the independent portable assembly, but this depends on the elctronic components and not on the actual concept of the invention.

Another version of a rotary element in contact with the carrier is illustrated in FIG. 10. This is a sphere 370 installed in freely rotatable manner, like a ball joint or the like, in a mounting 371. Its surface is wholly covered by micro-facets 372 of optional polygonal outline. Each of these facets 372 has a reflective area 373 shown in white and a non-reflective area 374 shown in black.

The shape of the facets 372 should be selected in such a way that the surface of the sphere 370 is covered with a minimum of discontinuities, as will be grasped from the following description given with reference to FIGS. 11 and 12.

Within the mounting or holder 371 is situated a radiation emitter 375 and a radiation receiver 376 directed in such manner that a beam R1 emitted by the emitter 375 is reflected at R2 by any reflective area 373 and is thus received by the receiver 376 whereas, on the contrary, the same beam R1 encountering a non-reflective area 374 would not reach the receiver 376.

The shape of the facets is not without importance since the distance separating two adjacent reflective surfaces 373 and two adjacent non-reflective areas 374 forms the distance unit. If the spherical shape is adopted however, this is to provide complete freedom of movement for translatory displacement of the independent portable assembly, which freedom is not available with a roller which perforce has one and only one axis of rotation. On the contrary, it is possible with a sphere to cope with lateral deviations since the sphere is able to turn in any direction whose axis is inscribed within the 180 degrees considered in the plane of the carrier 200–500 situated beyond the sphere whilst contemplating the direction of forward displacement, the other 180 degrees of the plane corresponding to reverse motion and being prohibited by virtue of this fact because the displacement of the sphere 370 in the opposite direction to that selected causes immediate stopping of the operation in progress. It should be remembered that the scanning operation or the reproduction operation is controlled from the receiver 376 which causes a sweep action of the pickup 100 or of the printer head 600 every time it receives a reflected beam R2.

The succession of the reflective areas and non-reflective areas whilst the sphere is being entrained in rotation consequently determines the scanning rate and there should be no appreciable difference between the distance separating two areas measured along the width of a polygon L1 and that measured along its diagonal L2.

The surface of the sphere 370 whose facets 372 have the form of hexagons is shown to an enlarged scale in FIG. 11. It is obvious that the greater the number of sides, the smaller the difference between L1 and L2 will be, a circle being the geometrical limit. There should not however be any troublesome discontinuity between two adjacent facets, and circles should therefore not be used unless the gaps separating them are to play a sizable part in respect of the emitted bean R1.

As a matter of fact, to determine the shape of the facets 372, allowance should be made for the diameter of the beam R1 and for the sensitivity of the receiver 376. It is apparent from FIG. 11 a circle C1 has been used to depict the image of a beam R1 the impingement of which is centred on a reflective area 373. Its perfect reflection is assured. A beam R1 which would be centred on a non-reflective area 374 would also provide an assured result: it would not be reflected at all. In exchange, a beam R1 the impingement of which would be located on the sphere 370 as shown at C2, would be reflected partially in proportion with the reflective surfaces and non-reflective surfaces affected. Depending on the sensitivity of the receiver 376, the reflected beam R2 would then be considered wholly as a reflected beam or as an absent beam. In order that the result obtained may be correct, the diameter of the circle C must perforce be smaller than the width L1 of the reflective areas 373 and non-reflective areas 374, respectively.

As for the difference between L1 and L2, it is obvious that this should theoretically be as small as possible, being negligible in practice if it is smaller than a few hundredths or even a few tenths of a millimetre.

Facets are shown in FIG. 12, the polygonel outline of which is a square, regarding which it is known that the difference between the side and the diagonal is the greatest of all regular polygons having equal sides.

This means that if the sphere is displaced in a direction whose axis is parallel to the sides of the squares, the distance unit is equal to the length of a side of the square, and that if the sphere is displaced in a direction whose axis is parallel to the diagonals of the squares, the distance unit is equal to the length of the diagonal of the square. Experience shows however that this difference, establishing the ratio 1:1.414 is negligible if the circle C is substantially equal to the inscribed circle of the square in question.

The square shape may be adopted if it is preferred for practical reasons. In the case of FIG. 12, the reflective areas are formed by whole squares arranged chessboard fashion with respect to the other squares forming non-reflective areas.

A known method may be applied to produce the facets, which renders it possible to obtain a network of sensing points arranged in a grid.

Referring now to FIG. 13 an embodiment is shown of the element sensing the relative displacement between the independent portable assembly and a carrier 200–500, which need not necessarily be in contact with the said carrier 200–500.

One versed in the art will be able to choose between different solutions available to him for this purpose. A doppler effect sensor has been selected in this case.

A sensor of this kind is well known per se to one versed in the art, and therefore it need not be described in detail. It comprises two solid elements 380 and 381 separated by a spacing means 382 which may be of a material or an air gap, for preference. The element 380 is allocated to an emitter 383 of radiation R3 which is reflected by the component material of the carrier 200-500 along a beam the angle of which is a function of the speed of relative displacement between the sensor and the carrier 200-500. The element 381 is associated with a receiver 384 sensing the reflected beam and the angle subtended by it. Three possibilities of reflection R4, R5 and R6 have been shown diagramatically, which correspond to three different speeds.

The reflection of the beam R3 does not depend on the contact or lack of contact between the sensor and the carrier 200-500. The independent portable assembly may consequently be situated at a particular distance from the carrier 200-500, which distance has been denoted by x in this case.

The possible variations of the value of x are small in practice and have no significant effect on the result.

The sweep of the pickup 100 or the sweep of the printer head 600 is caused with greater or lesser frequency depending on the angle or reflection of the beam R3.

According to another embodiment of the invention, the pickup and the printer head are arranged one behind the other, relative to the direction in which the independent portable assembly is to be displaced. The pickup is then provided with a special circuit by means of which the pickup is also enabled during the reproduction operation to play the part of an element sensing the relative displacement between the independent portable assembly and a carrier.

As soon as the printer head reproduces the first symbol on a carrier, the pickup detects and stores the spacing between two series of points reproduced, this spacing corresponding to the distance unit. The pickup causes reproduction at a rate matching the speed of displacement of the independent portable assembly so that the symbols may be reproduced correctly with respect to the distance unit. In this case too, the detection on the one hand and reproduction on the other hand are thus unaffected by the speed of displacement of the independent portable assembly, and the detection speed and reproduction speed are independent of one another.

The operation of the independent portable assembly which has been described in the following:

The user peruses a text appearing on a carrier 200 of any suitable type (work, periodical, documentation, etc.) from which he wishes to keep important passages. He takes the device 400 in his hand in the manner of a fountain-pen, actuates the knob 310 to energise the circuits, as well as the knob 353 if appropriate. He turns the device so that the read head 300 is placed in the correct directional setting to be able to roll on the same when the user will displace the device. The user displaces the device by hand in the direction of the arrow F at an optional speed and which may be varied. The area 100 is scanned and simultaneously displaced in the direction of the arrow F. The sensing elements 101 to 110 are activated and deactivated in succession and every time a distance unit has been travelled, the roller 302 generates sweep enabling signals which are transmitted via the connection 303 to the transcoder 304 which supplies corresponding data to the memory 306 in which they are stored. The user may thus pick up several consecutive lines, or particular words, or particular ideograms or obviously a diagram, a graphic design, a numeric table, etc., the memory 306 being able to have a very considerable capacity within a small volume.

Upon completing the pickup operation, the user may turn off the device by acting on the main switch 310 and leave it in this condition for an unspecified period, the data picked up remaining stored in the memory 306.

The user may generate data by means of the keys of the connection 323 and cause these to appear on the display unit 317. He may cause operation of the calculator 324 or of the clock 325, the data from which also appear on the display unit 317. He may optionally store these new data or proceed with the selective or systematic reproduction of all the data appearing on the display unit 317 in the form of uncoded symbols.

When the user wishes to effect reproduction of data, he inverts the device to position the same as depicted by FIG. 9, the printer head 313 then being situated above a carrier 500 which may for example be a normal sheet of paper: flysheet, file, record book or another. As before, the user displaces the device according to the arrow F, at any speed. The data stored in the memory 306 are extracted from the latter, and following transcoding into signals utilisable by the output transcoder 312, pass in review on the display unit 317 and cause the operation of the printer head 313 which operates by any known means: ink jet, daisy wheel, etc. The printer head 313 should obviously comprise printing elements installed in a coherent manner with respect to the sensing elements 101 to 110 of the reader head 300 and this has been indicated on the printer head 313 by a group 600 identical to the area 100 of the reader head 300.

Depending on the number of distance units travelled, the roller 302 determines the print rate corresponding to the displacement of the device and the graphic symbols are reproduced as stated in the foregoing under reference to FIGS. 6, 7 and 8. Once the reproduction is completed, the user operates the knob 310 to open the switch 309 and may stow the device away.

When the displacement of the device stops, the roller 302 is stopped and no longer generates enabling signals, that is to say no longer actuates the sweep action. The pickup operation is thus no longer possible.

If the memory 306 is of the kind in which the data stored are wiped when it is no longer energised, it is obvious that the user cannot reproduce the graphic symbols picked up unless he keeps the device "live" which is what he may do for comparatively short periods only. If, on the other hand the memory retains the data stored until they are erased deliberately (according to a well known procedure), the user may perform a pickup operation or several pickup operations and reproduce these after a long period. This solution, which evidently lies within the ambit of one versed in the art, is plainly preferable because it provides a very great flexibility of application. For example, the user may perform a pickup operation whilst he is away: in a particular place such as a library, or duing a trip by rail, in the air, etc., and then reproduce the data picked up in a file upon returning to his office or home.

Items of information may by this means be collated from sources of all kinds and retained subsequently whilst grouping these in a sequence depending wholly on the user's intention: newspaper abstracts on a given subject, compilation of a variety of items of information regarding a project, bibliography, quotations, etc.

The data picked up may however also be transferred to a separate outside instrument by electronic means.

The output transcoder 312, or the actual memory 306, or the circuit 320, may be connected via a channel 362 to a coupling connector 363 of any known kind, for example operating by means of IR radiation, optical fibres, radio etc., to enable the independent portable assembly to be connected to an outside device such as a computer, or a component of the same: keyboard, printer, internal memory, etc. In this case, the independent portable assembly may act as a pickup and as a buffer memory for a fixed data processing centre comprising a memory to which are transferred the data originally stored in the memory 306.

It is also possible to establish a close correlation between optical pickup, selection and date processing. The coupling connector 363 may consequently be an interface for an outside device.

It is possible to provide memory extensions by adopting a standard type provided with a comparatively modest memory 306 and by specifying plug-in memories, for example in the extension of the case 400, which as is wellknown, may either by supplemental to the original memory, or substituted therefor. The user may procure equipment in proportion with his requirements, or make selective use of the memories, for specialist or occasional undertakings.

For example, it is possible to have several different and specialised memories: one memory for collation of data relating to a given subject, one memory for numerals and tabular matter, etc.

The printer head may be selected to have reproduction dimensions different from those of the pickup operation. For example it is possible to reproduce graphic symbols or patterns picked up to an enlarged or reduced scale, the change being determined once and for all or adjustable between the ration 1:1 and an extreme ratio.

To increase the contrast between the light areas and dark areas, that is to say to make the device more sensitive, the pickup 300 may be backed up by a small spotlight or thin light beam (not illustrated), aimed at the carrier which is to be scanned and powered from the battery 307 or a separate battery. The light beam of this spotlight is reflected by the light areas and not by the dark areas. The sensing elements 101 to 110 react accordingly.

The device may be provided with a contrast indicator to inform the user whether he should act on a control to intensify the illumination for the purpose of improving the scanning sensitivity and the reproduction quality.

The quantity of light may be adjusted by hand, or automatically, and for the scanning action only, to save on power consumption.

The setting of the optimum contrast during scanning may advantageiously be performed by automatic or manual intensification of the pickup sensitivity. This solution could prove to be more advantageous than adjusting illumination since it needs less power.

The memory 306 may be drained completely by a single reproducing operation: the data stored are wiped in step with their reproduction. Provision may also be made for the data to be retained in storage unless they are wiped deliberately from the memory 306 according to a method well known per se. This erasure may equally be programmed to occur automatically after a number of reproducing operations, such as two or three for example. This allows a single pickup operation to be carried out and the reproduction to be set down at two or three different points.

An audible or visible signal may be provided to warn the user that the memory 306 had been drained at the end of a data reproduction procedure.

When the device is utilised in the reproduction mode, the roller 302 turns in the opposite direction to that which it had during the pickup mode. This difference may act as a factor to effect the extraction of data from the memory 306. It is thus possible for the operation of thd device to be made fully automatic, depending on whether it is the pickup 300 or the printer head 313 which confronts the carrier.

Provision may however evidently also be made for the user to have to act on particular controls.

The direction in which the independent portable assembly is set in translatory motion and consequently the direction of rotation of the roller 302, is not optional. Taking the example of FIGS. 8 and 9, if provision is made for the roller 302 to turn in one direction (referred to as "forward displacement") when the device operates in the pickup mode, and in the opposed direction (referred to as "reverse") when the device operates in the reproduction mode, the pickup operation has to be blocked in reverse and the reproducing operation in the forward displacement mode, because as stated again, the invention relates to a device intended to be used freehand like a fountain-pen, without a guide and in any conditions. The user should then be assured that irregular or accidental movements will have no repercussions on the quality of the service provided: picking up and reproduction. An unintentional motion into reverse during the pickup operation should interrupt the pickup operation, safeguard the symbols already picked up and prevent any extraction of data from the memory 306. The pickup operation is resumed as soon as forward displacement starts again.

It is evident that everything which has been explained regarding the pickup operation is applicable symmetrically for the reproducing operation.

According to a modification of this general principle, provision may be made for the user to make a choice (for each utilisation or once and for all by an internal adjustment) of the direction in which the independent portable assembly should be placed in translatory motion for the pickup operation and for the reproducing operation. For example, it is thus possible to arrange for the independent portable assembly to be placed in forward translatory motion for the pickup as well as the reproducing operations, forward motion meaning from left to right and corresponding to the normal reading and writing direction in the West. Any displacement in reverse then prohibits the pickup as well as the reproducing operation.

The user will select the opposite solution, being reverse instead of forward motion, if he is used to reading and writing from right to left, as in the case of Arabic script.

Any displacement in forward motion then prohibits the pickup as well as the reproducing operations. All these statements are applicable in turn in the case of vertical scripts.

This represents an eighth safety feature for the integrity of the symbols which are to be processed: the symbols cannot be picked up and the symbols stored cannot be reproduced except in strictly correct manner, without interference and in the correct direction, and no symbol stored can be lost accidentally.

The independent portable assembly may be devised in a manner different from the example illustrated and described. In particular, the pickup 300 and the printer head 313 may be superimposed to avoid having to turn the assembly over to change from the pickup mode to the reproduction mode. A single head may also be produced which comprises sensing elements and reproduction elements which are combined and act selectively. It is possible to provide an automatic control or an element which has to be actuated by the user, to change from the pickup mode to the reproduction mode.

The pickup 300 may be formed by a grid having sensing elements which are no longer restricted to a single line but instead are distributed in two dimensions. The columns of the grid are scanned individually one after the other after the signal triggering the sweep action, to improve the definition of scanning and of reproduction.

The invention may be combined with any available electronic and data processing facilities: incremental script, characters of greater or lesser boldness, variable spacing between the words or letters, enlarged characters, roman or italic style, underlining, etc.

Provision may also be made for reproduction in black and white or in several colours. A pickup operation on graphic designs may be performed in colours or in black and white and select particular reproduction colours for specific terms or ideograms it is intended to endow with special emphasis or meaning. The means of enabling this to be done are well known to one versed in the art since they are those already in use for the production of graphic reproduction heads in general.

The element sensing the displacement of the device on the carrier may be or any known kind, such as an accelerometer, ratchet wheel, inertial mechanism, Doppler effect sensor, laser beam, etc.

The pickup may comprise an optical system: optical fibres, focussing lens for example, especially with the embodiment according to which the independent portable assembly has to be kept at a particular distance above the carrier.

According to a particular embodiment, it is possible to combine the sensing elements and the element sensitive to the relative displacement between the independent portable assembly and the carrier which is to be scanned. It is apparent from FIG. 14 that a roller 700 is rotatably arranged on a pin 701 parallel to the plane of the carrier 200 which is to be scanned, and that it carries small bars 702 each comprising several sensing elements. The angular distance separating two adjacent small bars corresponding to the distance unit selected. When the roller 700 is set in rotation, it carries the small bars 702 consecutively to the vertical V of the carrier 200 and provision is made for the sweep action of each small bar to be actuated only at the instant at which it reaches this position.

This control may be secured, for example, by incorporating a baffle 703 provided with a slot 704, so that the sensing elements are in action only in alignment with the slot 704. It is also possible to act electronically, by scheduling the actuation only when each small bar 702 reaches its precise reading position, or to combine these two solutions.

According to one embodiment of the invention, the scanning area has an adjustable height H, that is to say that the scanning action is performed over a greater or lesser width, as a function of a setting selected by the user.

It is apparent from FIG. 15 how this may be established upon adopting the static sweep solution.

In this case, the area 100 comprises an odd number of sensing elements 120 to 130 so that these may be distributed symmetrically at either side of the central element 125. The scanning width, meaning the sweep amplitude, may be adjusted by interposing a variable number of sensing elements symmetrically with respect to the axis of displacement which is at right angles to the long axis of the area 100.

In a very restricted sweep version, it is possible for example to cause the action of no more than the elements 124, 125 and 126 (or three elements all told) which provide a sweep height H1.

A very precise setting could be adopted, operating element by element at either side of the central element 125. Another version has been illustrated which yields a sweep height H2, comprising the elements 122, 123 and 124 at the bottom, the element 125 at the centre and the elements 126, 127 and 128 at the top, or seven sensing element altogether. Finally, the height H3 corresponds to the maximum sweep amplitude, with all the sensing elements 120 to 130.

The setting of the sweep height is an advanced solution which allows the scanning wisth to be matched to different graphic patterns. In this case, the maximum height H3 may advantageously exceed the height of a standard text line. It is then possible, for example, to provide for the picking up of a single line with a minimum sweep height H1, two lines with a medium height H2 and three lines with a maximum height H3.

All these settings may be checked by means of the display unit 317.

The invention renders it possible to reproduce typical texts which have not necessarily deen detected by the pickup and which are kept in the memory. This may be so in the case of the information given on a visiting card, for example.

An interesting application of the invention is the detection of the features of an identity document provided by a customer paying for his purchases in a store by means of a cheque, for reproduction of these on the back of this cheque. As a matter of fact, this operation occurs very rapidly and without any risk of error thanks to the invention, whereas for a cashier to make a copy by hand is comparatively protracted and does not bar transcription errors.

Another application of interest is the detection of correspondence references, invoice references, memoranda, descriptions, estimates etc. and their entry into registration books, in particular in numbered and dated sequences.

The independent portable assembly operates just as well in a horizontal plane as in a vertical plane (or evidently an inclined plane). It may consequently be applied to pick up an address on a document and to reproduce this address on a parcel such as a postal parcel, a case, etc.

If the independent portable assembly is connected to an external instrument, provision may be made to utilise the data stored, no longer by reproduction by means of the printer head 600, but by display on a screen of large size of the kind used in amphitheatres, museums and other places arranged for the public in great numbers.

As may be implemented by one versed in the art, the operation of the independent portable assembly may be arranged to occur according to the methods of analog or digital data processing.

I claim:

1. A process of manually displaying a movable and independently portable assembly without material guidance for the purpose of reading and storing visual data appearing on a first unspecified carrier and reproducing said visual data on a second unspecified carrier, the process being of the type wherein said assembly comprises a reading head and a printing head and according to which, furthermore:

the assembly is placed to confront the first carrier, the assembly is moved along a selected linear path on said first carrier, graphic symbols in said path are read by the reading head, the graphic symbols read by the reading head are transcoded into electrical data signals, the data signals are introduced into a memory, characterized in that the assembly is portable and independent and contains a memory and its own energy source, and:

the assembly is moved along said path in one direction only at an unspecified speed, the graphic symbols read by said reading head extend over a width the minimum value of which is of the order of the smallest dimension of a standard line of words or ideograms, the transcoded data signals are fed from the reading head into the memory as a function of the extent of the displacement of the assembly, subsequently, the assembly is placed to confront the said second carrier, the assembly is then moved along a linear path on said second carrier in only one direction at an unspecified speed, the stored data signals are then extracted at a speed correlated with the extent of displacement of the assembly, the extracted data signals are transcoded into electrical signals and fed to the printing head, printing on said second carrier with said printing head symbols by depositing ink on the said second carrier with said printing head in response to the received electrical signals at a speed correlated with the extent of displacement of the assembly relative to said second carrier, the operation in progress, whether reading or printing, is interrupted when the assembly is stopped, the operation in progress, whether reading or printing is interrupted when the assembly is displaced in the direction opposite to that originally selected.

2. A process according to claim 1, further characterized in that, the assembly is placed on a carrier, the operation in progress, whether reading or reproduction, is interrupted when the assembly is no longer in contact with the carrier.

3. A process according to claim 1, further characterized in that, the operation in progress, whether reading or reproduction, is interrupted when the assembly becomes spaced from the carrier by a distance greater than a predetermined maximum.

4. A process according to claim 1, further characterized in that, to correlate the speeds of reading and reproduction on the one hand and the displacement of the assembly on the other, the feeding of data into the memory and the extraction of data from the memory is effected at the rate of a certain maximum number of items of said data per unit of distance actually travelled by the assembly.

5. A process according to claim 1, further characterized in that, electrical signals are displayed in readable form at the rate at which the corresponding data signals are either introduced into the memory or extracted from the memory.

6. A process according to claim 5, further characterized in that, the data signals stored in said memory are processed before printing corresponding symbols on a carrier.

7. A process according to claim 6, further characterized in that, the data signals are processed by introducing additional data signals into said memory.

8. A process according to claim 1, further characterized in that, the data signals stored in said memory are erased.

9. An independently portable and manually movable assembly for reading, storing, and reproducing visual data appearing on an unspecified carrier, said assembly characterized in that it comprises oblong casing (400) of the tracing instrument type, which has an optical pickup (300) for reading said visual data and at least one printing head (600) for reproducing said visual data in ink, functionally independent of one another, and which contains at least one memory (306) for storing data corresponding to said visual data, an independent energy source (307) and other functional components a first circuit incorporating the pickup (300), a transcoder (304) and the memory (306), a second circuit incorporating the memory (306), a transcoder (312) and the printing head (600), and at least one contactor (350-351) intended to activate selectively either the first circuit for reading the visual data and storing correspoding transcoded data, or the second circuit for the extraction of stored transcoded data and reproduction of corresponding visual data, the assembly further comprising at least one element (302-370-380 to 384-700) which is sensitive to relative displacement of the assembly and a carrier (200-500) confronting which the said assembly is to be placed, and which is intended on the one hand to generate enabling signals to activate either the first or the second circuit, as a function of the number of the number of distance units travelled by the assembly and not as a function of the speed at which the latter is displaced and, on the other hand, to prohibit access to the memory (306), input and output, when the assembly is either stopped or displaced in the direction opposite to that originally selected.

10. An assembly according to claim 9, further characterised in that, the element which is sensitive to the relative displacement of the assembly and a carrier (200-500) is circular, is rotatably mounted and must be kept in contact with the said carrier (200-500) in order to be moved in rotation during the said displacement and to enable it to generate enabling signals according to a repetition rate which is directly proportional to the number of distance units travelled by the said rotating member (302-370-700) during displacement of the independent portable assembly.

11. An assembly according to claim 10, further characterised in that, the circular rotary element (700) carriers small bars (702) each made up of at least one sensitive element (120-130) and spaced one from another according to the value of the distance unit, which value can be such that the small bars (702) are positioned against one another.

12. An assembly according to claim 10, further characterised in that, the circular rotary element (302-370-700) carries multiple sensitive elements (372) distributed in a fine network such as a screen.

13. An assembly according to claim 9, further characterised in that, the element sensitive to the relative displacement of the independent portable assembly and a carrier (200-500) is a detector without material contact with the carrier.

14. An assembly according to claim 9, further characterised in that, the element sensitive to relative displacement of the independent portable assembly and a carrier (200-500) is constituted by the pickup (300) itself, which is associated with a circuit for the detection and storage of symbols reproduced by the printing head (600) in order to determine the distance units and, consequently, the reproduction rate.

15. An assembly according to claim 9, further characterised in that, it comprises a detector (333-340) of its own correct position relative to a carrier (200-500), which detector forms part of a third circuit on which it is to act according to whether the assembly is or is not in the correct position relative to the carrier (200-500).

16. An assembly according to claim 15, further characterised in that, the position detector (333) is sensitive to effective contact between the independent portable assembly and a carrier (200-500).

17. An assembly according to claim 15, further characterised in that, the position detector (340) is a proximity detector.

18. An assembly according to claim 15, further characterised in that, the position detector is constituted by a contactor which is constantly biassed towards an inoperative position, in which it opens a circuit, and which has to be placed in an operative position, in which it closes a circuit, by means of a sensor (335) external to the assembly and sensitive to the effective presence of a carrier (200-500) relative to the part of the said assembly which has the pickup (300) and the printing head (600).

19. An assembly according to claim 15, further characterised in that, the third circuit includes at least one warning device (342) such as an indicator light (343).

20. An assembly according to claim 15, further characterised in that, the third circuit includes an access to the memory (306) on the input side for storage of data coming from the pickup (300) as well as on the output side for the extraction from the memory (306) of data intended for the printing head (600), the said access, input and output, being automatically established when the position detector (333-340) is in the state which corresponds to a correct effective position of the asembly relative to a carrier (200-500) and automatically cut off when the detector (333-340) is in the opposite state which corresponds to an incorrect position of the assembly relative to a carrier (200-500).

21. An assembly according to claim 9, further characterised in that, the effective width (H) of the pickup (300) and the effective width (H) of the printing head (600) are adjustable in a coordinated manner as a function of at least two values.

22. An assembly according to claim 9, further characterised in that, the pickup (300) is associated with a radiation emitter to enhance the contrast between the graphic symbols and the carrier (200).

23. An assembly according to claim 9, further characterised in that, it has a display (317) which has an effective display height (H) at least equal to the effective width (H) of the pickup (300) and of the printing head (600) and which is at least of the order of the smallest dimension of a standard line of words or ideograms, and on which the symbols are to appear in readable form.

24. An assembly according to claim 23, further characterised in that, it comprises a circuit (320) including the display (317) so that the symbols may appear in readable form on the display (317) in chronological review, simultaneously with the displacement of the assembly, these symbols being either the detected symbols, after their transcoding, or the transcoded signals from data extracted from the memory (306).

25. An assembly according to claim 23, further characterised in that, it comprises a third circuit (320) controlled by at least one key accessible from the outside of the said portable assembly, which circuit (320) includes the display (317) and at least one other functional component to allow the display of symbols in readable form, when the assembly is idle, the displayed symbols being two types of symbols:

one type being symbols issuing from the memory (306) and a second type being symbols introduced from sources other than the memory, a key being provided for operating said third circuit in order to establish the input access to the memory (306) so that the introduced signals can be stored.

26. An assembly according to claim 25, further characterised in that, it contains a fourth circuit allowing the reproduction of the symbols in a form different from that of the symbols read.

27. An assembly according to claim 25, further characterised in that, the said fourth circuit includes the display (317), the memory (306), input and output and a transcoder (321) and excludes the transcoder (312) of the printing head (600), in order on the one hand to enable symbols corresponding to the data extracted from the memory (306) to be displayed in readable form while neutralising the printer head and on the other hand to allow the storage of data introduced from a source other than said memory.

28. An assembly according to claim 9, further characterised in that, it is provided with means (363) for connection to a separate outside data transmitting or receiving means.

29. An assembly according to claim 28, further characterised in that, the said connecting means (363) is connected to the memory (306) by a circuit allowing the transfer, with or without erasure of data which the memory (306) contains, to a second memory of the separate outside data transmitting or receiving means.

* * * * *